(12) United States Patent
Stojkovic et al.

(10) Patent No.: US 9,944,333 B1
(45) Date of Patent: Apr. 17, 2018

(54) TAILGATE STORAGE COMPARTMENT

(71) Applicant: Ford Global Technologies, LLC, Dearborn, MI (US)

(72) Inventors: Dragan B. Stojkovic, Taylor, MI (US); Joshua Robert Hemphill, White Lake, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/384,708

(22) Filed: Dec. 20, 2016

(51) Int. Cl.
| | |
|---|---|
| *B62D 33/027* | (2006.01) |
| *B60R 5/04* | (2006.01) |
| *B62D 33/03* | (2006.01) |
| *F41C 33/06* | (2006.01) |
| *B60R 9/06* | (2006.01) |
| *B60R 11/00* | (2006.01) |

(52) U.S. Cl.
CPC ............ *B62D 33/0273* (2013.01); *B60R 5/04* (2013.01); *B60R 9/06* (2013.01); *B62D 33/03* (2013.01); *F41C 33/06* (2013.01); *B60R 2011/0019* (2013.01)

(58) Field of Classification Search
CPC ................ B60R 5/04; B60R 7/14; B60R 9/06
USPC ........................... 296/37.1, 37.6, 50, 51, 54.1
See application file for complete search history.

(56) References Cited

U.S. PATENT DOCUMENTS

| | | | |
|---|---|---|---|
| 5,498,049 A | 3/1996 | Schlachter | |
| 6,811,067 B2 | 11/2004 | Muizelaar et al. | |
| 7,261,357 B1 * | 8/2007 | Bechen | B60R 3/02 |
| | | | 296/57.1 |
| 7,628,439 B1 * | 12/2009 | Strong | B62D 33/0273 |
| | | | 108/44 |
| 8,424,946 B2 * | 4/2013 | Newberg | B60R 5/04 |
| | | | 108/44 |
| 9,315,221 B1 | 4/2016 | Anderson | |
| 2008/0315608 A1 * | 12/2008 | Heller | B60P 7/14 |
| | | | 296/50 |
| 2009/0072571 A1 * | 3/2009 | Elliott | B60R 3/007 |
| | | | 296/62 |
| 2015/0336622 A1 | 11/2015 | Worden et al. | |
| 2016/0121801 A1 * | 5/2016 | Masih | B60R 9/06 |
| | | | 296/37.6 |
| 2016/0236625 A1 * | 8/2016 | Kogut | B60R 11/00 |

* cited by examiner

*Primary Examiner* — Jason S Daniels
(74) *Attorney, Agent, or Firm* — Jason Rogers; Brooks Kushman, P.C.

(57) ABSTRACT

A pickup-truck box includes a pair of opposing sidewalls each having a first latching component. A tailgate is attached between the sidewalls and includes an outer panel, an inner panel, and opposing side panels each facing one of the sidewalls and interconnecting the inner and outer panels to define a body defining an interior space. A pair of hinges pivotally attach the tailgate to the sidewalls such that the tailgate is pivotal about the hinges between an open position and a closed position. A pair of second latching components are engageable with a corresponding one of the first latching components to hold the tailgate closed. A storage compartment is disposed in the interior space and defines a cargo area accessible through the opening defined in one of the side panels. A corresponding one of the sidewalls blocks access to the opening when the tailgate is in the closed position.

18 Claims, 4 Drawing Sheets

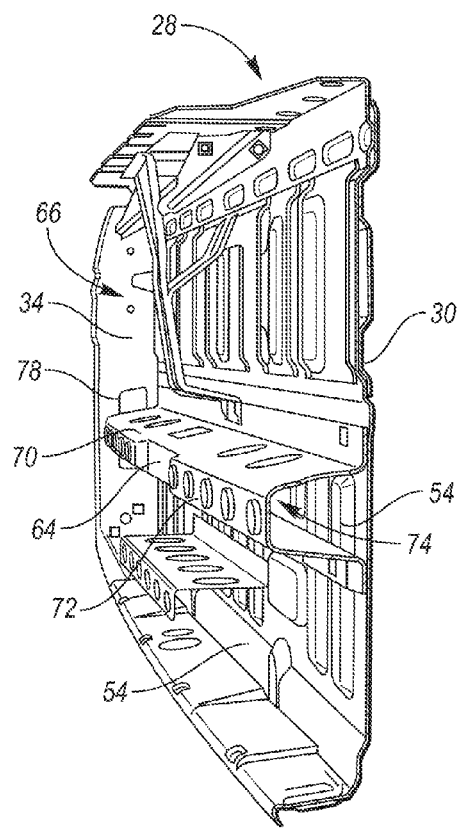
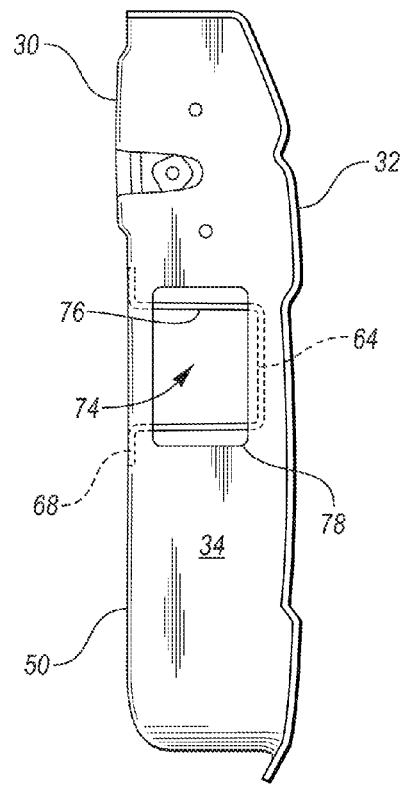
FIG. 3  FIG. 4
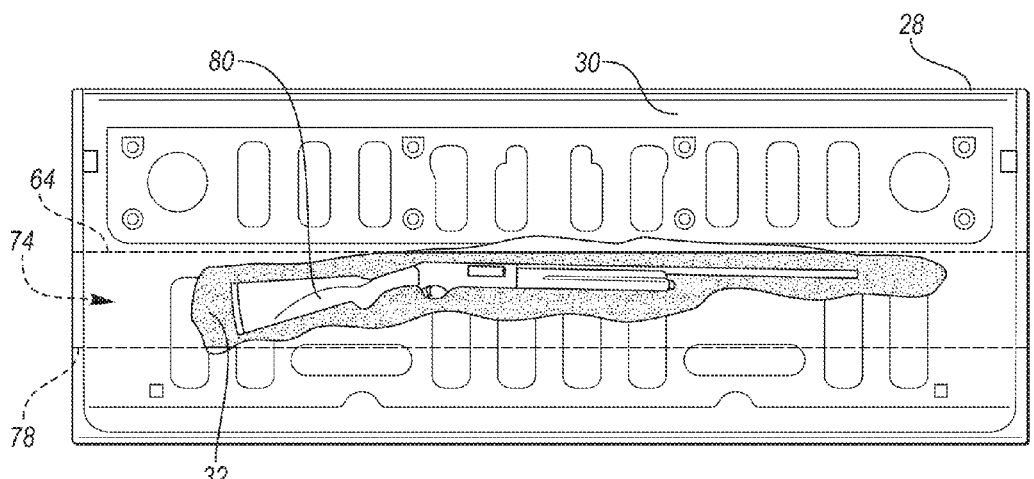
FIG. 5

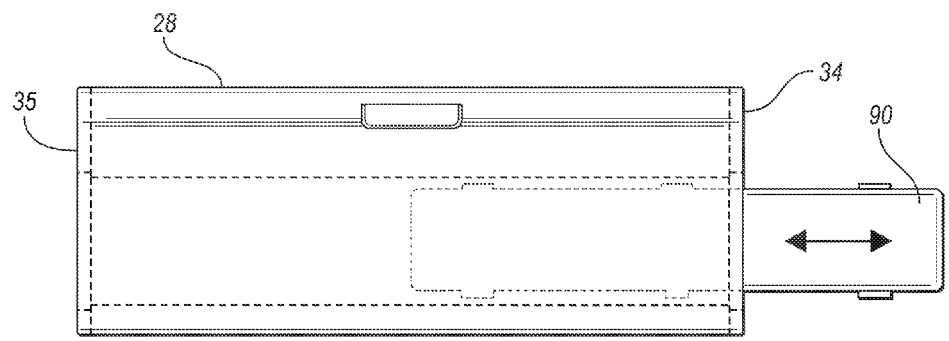
FIG. 9
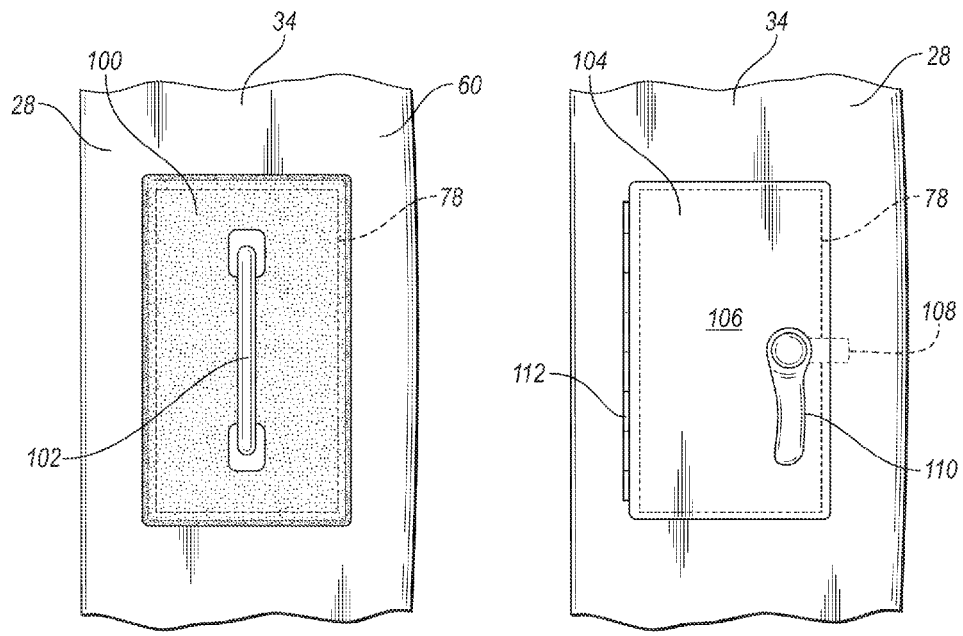
FIG. 10     FIG. 11

TAILGATE STORAGE COMPARTMENT

TECHNICAL FIELD

The present disclosure relates to pickup-truck tailgates and specifically to tailgates having internal storage compartments.

BACKGROUND

Pickup trucks include a cab and a box that are supported by a frame. The box has a bed, opposing longitudinal sidewalls, a headboard, and a tailgate. The tailgate is pivotally attached to the sidewalls and movable between an open position and a closed position. Latches are disposed on an upper portion of the tailgate to hold the tailgate in the closed position, and tension members are connected between the sidewalls and the tailgate to support the tailgate when in the open position. Tailgates are typically removable from the box to increase utility of the pickup truck.

Unless otherwise equipped, the box has an open top leaving cargo disposed within the box vulnerable to unauthorized users. The cab presents a more secure environment for cargo, but storing cargo in the cab takes up valuable passenger space, especially for bulky cargo. Aftermarket lockable storage bins are available, but they require user installation and are conspicuous to unauthorized users.

Providing secure, inconspicuous storage in the box can alleviate these and other problems.

SUMMARY

According to one embodiment, a tailgate assembly includes a body having an outer side, an inner side, and a pair of lateral sides interconnecting the inner and outer sides to define an interior. One of the lateral sides defines an opening into the interior. A beam is disposed in the interior and defines a storage compartment accessible through the opening.

According to another embodiment, a pickup-truck box includes opposing sidewalls and a tailgate connected between the sidewalls. The tailgate includes an outer panel, an inner panel, a side connecting between the panels and defining an opening. A beam is disposed in an interior defined between the panels and is connected to one of the panels to define a storage compartment aligned with the opening.

According to yet another embodiment, a tailgate assembly for a pickup-truck box having sidewalls is disclosed. The tailgate assembly includes a tailgate having an outer panel, an inner panel, and opposing side panels each facing one of the sidewalls and interconnecting the inner and outer panels to define a body defining an interior space. A pair of hinges pivotally attach the tailgate to the sidewalls allowing the tailgate to be pivoted between an open position and a closed position. A pair of latching components are each disposed on one of the side panels and are engageable with a corresponding latching component of one of the sidewalls to secure the tailgate in the closed position. A storage compartment is disposed in the interior space and defines a cargo area accessible through the opening defined in one of the side panels. A corresponding one of the sidewalls blocks access to the opening when the tailgate is in the closed position.

BRIEF DESCRIPTION OF THE DRAWINGS

FIG. 3 is a cross-sectional perspective view of the tailgate taken along cut line 3-3.

FIG. 4 is a side view of the tailgate.

FIG. 5 is a front cutaway view of the tailgate with a portion of the inner panel removed to illustrate an item stored in a storage compartment disposed within the tailgate.

FIG. 9 is a back view of the tailgate illustrating the storage case being received in and removed from the tailgate storage compartment.

FIG. 10 is a side view of the tailgate illustrating a cover for closing an access opening of the storage compartment.

FIG. 11 is a side view of the tailgate illustrating a door for closing the access opening of the storage compartment.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
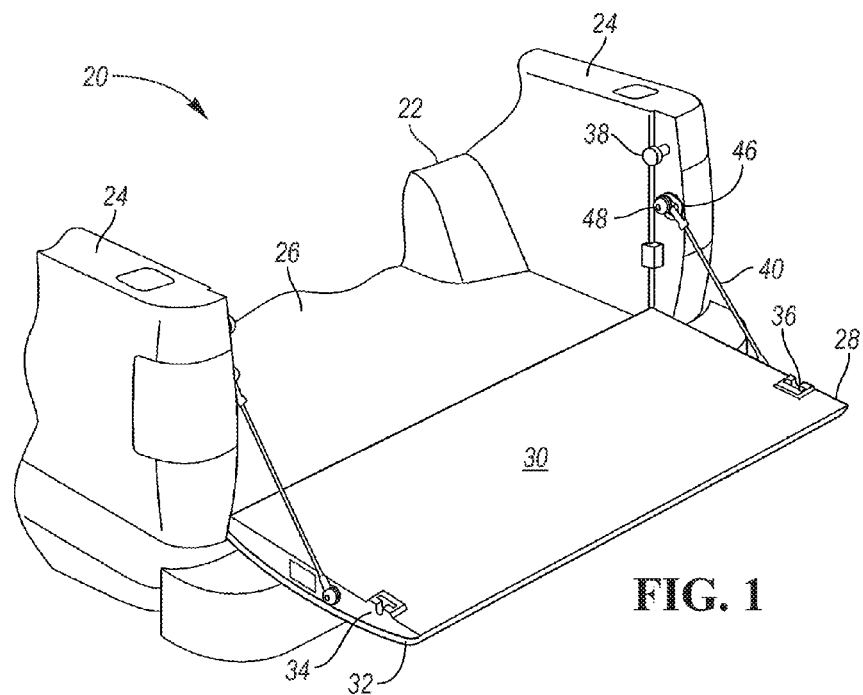
FIG. 1 is a rear perspective view of a portion of a pickup truck.

Referring to FIG. 1, a pickup-truck 20 includes a box 22 having a pair of sidewalls 24 and a bed 26. A tailgate 28 is pivotally attached to each of the sidewalls 24 at a rear end of the box 22. The tailgate 28 includes an inner panel 30, an outer panel 32, and a pair of lateral sides 34 extending between the inner panel 30 and the outer panel 32. In some embodiments, the lateral sides 34 are integrally formed with the inner panel or the outer panel, and are secured to the other of the inner and outer panels by hemming or by another type of connection. Each of the lateral sides 34 includes a connection feature that is engageable with a corresponding connection feature on one of the sidewalls 24. The connection features may be a hinge pin and a socket. The tailgate 28 pivots between an open position and a closed position along the connection features. Each lateral side 34 may include a latch 36 that cooperates with a corresponding striker 38 connected to one of the sidewalls 24. The latch 36 and the striker 38 secure the tailgate 28 in the closed position. The tailgate 28 also includes a handle operably connected to the latches 36 and configured to disengage the latches 36 from the strikers 38 to open the tailgate 28. The latches 36 may include a lock operable by a key, a button, or a key fob. When locked, the tailgate 28 cannot be pivoted to the open position.

The tailgate 28 may include a pair of tension members 40 that support the tailgate 28 in the open position. Each tension members 40 may be a cable, a chain, a rope, or links that either telescope or fold relative to each other. Each tension member 40 includes a fixed end attached to one of the lateral sides 34 of the tailgate 28, and a free end that has a clip 46. The clip 46 is attachable to a cable post or anchor 48 that is disposed on one of the sidewalls 24. The clip 46 may define a slot that having a larger portion and a smaller portion. The cable post 48 includes a shank and a head that has a diameter larger than the shank. The larger portion is sized to be larger than the head allowing the clip 46 to be received on and off of the post 48. The smaller portion is sized to substantially match the size of the shank. The head is larger than the smaller portion preventing detachment of the clip 46 and the post 48 when the post is located within the smaller portion. The clip 46 may include a finger extending over a portion of the larger portion. The finger may be a flexible metal strip, such as a flat spring. A tip of the finger engages with the post 48 to hold the post in the smaller portion preventing disconnection of the clip 46 from the post 48. Tailgate 28 may be removed from the box 22 by disconnecting the cables 40 from the posts 48 and disconnecting the first connection features from the second connection features.

Figure 2:
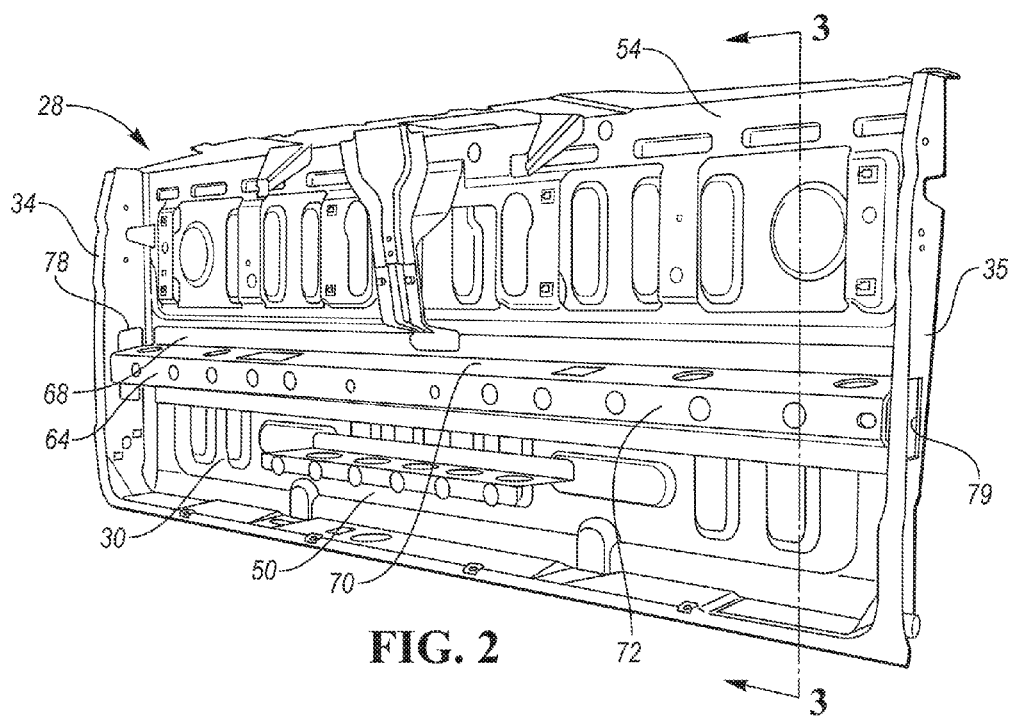
FIG. 2 is a partial perspective view of a tailgate with the outer panel omitted to show the inner components of the tailgate.

Referring to FIGS. 2, 3 and 4, the inner panel 30 may have a transverse side 50 and opposing lateral sides 34 and 35 that extend from the transverse side 50 towards the outer panel 32. The transverse side 50 and the lateral sides 34, 35 may be integrally formed, for example, as a single metal stamping. Alternatively, the transverse side 50 and the lateral sides may be separate components that are joined together. In other embodiments, the lateral sides 34, 35 may be integrally formed with the outer panel 32.

A structural member is disposed within an interior 66 of the tailgate 28 between the inner and outer panels. In one or more embodiments, the structural member is a beam 64 that is attached to the inner panel, the outer panel, or both. In the illustrated embodiment, the beam 64 is a U-shaped beam having a pair of flanges 68 attached to an interior surface 54 of the transverse side 50. A pair of spaced apart webs 70 are each attached to one of the flanges 68 and extends outwardly from the transverse side 50 towards the outer panel 32. A faceplate 72 connects between the webs 70 and is adjacent to an interior surface of the outer panel 32.

The beam 64 cooperates with the inner panel 30 to define an enclosure that forms a tailgate storage compartment 74. The inside surfaces 76 of the beam 64 define some walls of the storage compartment 74 and the transverse side 50 forms another wall of the storage compartment 74. At least one end of the beam 64 is open allowing items to be inserted into the storage compartment 74. An access opening 78 is defined in the lateral side 34 and aligned with the beam 64 so that items can be inserted through the lateral side 34 and into the storage compartment 74. The lateral side 35 may also include an opening 79. Providing openings in both lateral sides helps prevent items from getting trapped in the storage compartment 74.

Referring to FIG. 5, any type of storage item that will fit may be stored within the storage compartment 74. Due to its shape, the storage compartment 74 may be particularly well-suited for elongate objects such as firearm 80, which is illustrated as a shotgun. Other suitable items include fishing poles, chains, jumper cables, tie-downs, baseball bats, golf clubs, and others.

Typically, the inside surfaces of a beam are not machined and may be rough including sharp edges and other features that could damage a stored item as well increase the difficulty of inserting and removing items from within the beam. The beam 64 may be finished to remove sharp edges and other unwanted defects from the inner surface 76 to prevent damaging stored items and to increase usability of the storage compartment 74. The interior surface 54 may also be finished in the area proximate the storage compartment. Alternatively, an interface may be proved between the beam 64 and the storage item instead of finished the beam 64, the interior surface 54, or both. The interface may be a lining on the inside surfaces 76 and the interior surface 54, or may be a removable storage case. These will be described in more detail below.

Figure 6:
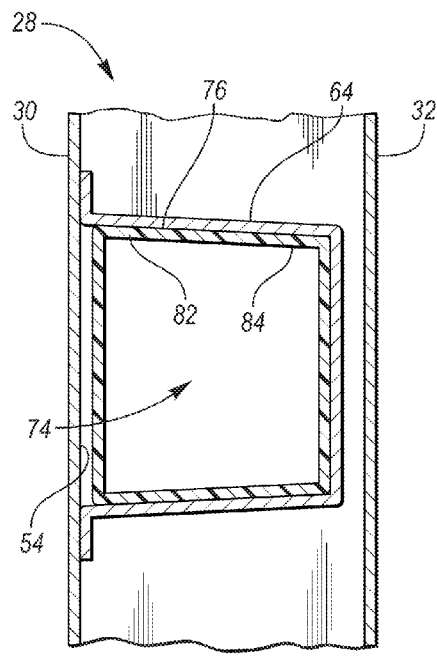
FIG. 6 is a side cross-sectional view of a tailgate beam having a liner disposed on inside surfaces of the beam.

Referring to FIG. 6, the inner surface 76 may be covered with a liner 82 or a sleeve. The liner 82 may be a separate component that is attached to the beam 64 and/or the interior surface 54, or may be a coating that is applied to the beam and/or the inner surface. In the illustrated embodiment, the liner 82 is a separate component that is connected to the beam 64 by clips, fasteners, adhesive, or any other means known in the art. The liner 82 may have a closed cross section, such as the generally rectangular cross section illustrated. The inside surfaces 84 of the liner 82 form the inner walls of the storage compartment 74. The liner 82 may be made out of plastic, metal, rubber, foam, cork, or composite. The inside surfaces 84 may be formed to have a smooth surface to facilitate insertion and removal of items into and out of the storage compartment 74. While illustrated as covering all inner surfaces of the beam, the liner 82 may only cover some surfaces of the beam 64. For example, the liner 82 may not cover the upper wall of the beam 64.

Figure 7:
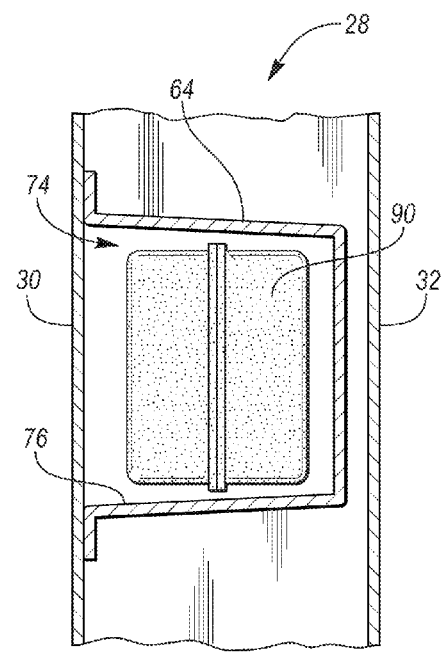
FIG. 7 is a side view of a tailgate storage case received within a tailgate storage compartment.
Figure 8:
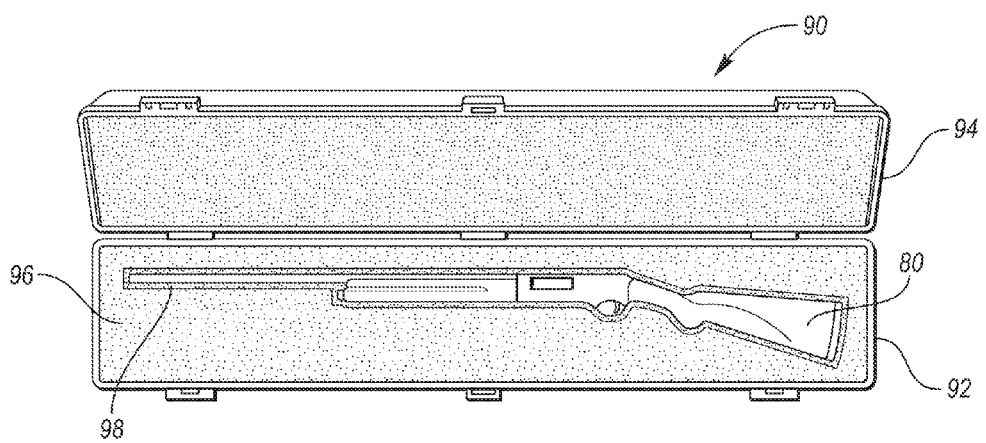
FIG. 8 is a perspective view of a tailgate storage case in an open position.

Referring to FIGS. 7, 8, and 9, the storage compartment 74 may be utilized in conjunction with a storage case 90. The beam 64 may or may not be lined when used in conjunction with the storage case 90. The storage case 90 is adapted to be received through the opening 78 and fit snugly within the storage compartment 74 to prevent excessive movement of the case 90. The case 90 may include a base 92 and a lid 94. The lid may be pivotably connected to the base. In some embodiments, the case 90 may have a clamshell design in which the base 92 forms one half the clamshell and the lid 94 forms the other half of the clamshell. The base 92 may include an insert 96, such as padding, that defines a cavity 98. The cavity 98 may be shaped to house a particular type of item. In the illustrated embodiment, the cavity 98 is for storing a firearm, such as firearm 80. The case 90 may be configured to house other types of items. In some embodiments, the case 90 may include multiple discrete cavities. The insert 96 may be removed and replaced with another insert that is configured to house different types of items to increase the utility of the case 90. The vehicle manufacturer, dealership, or aftermarket supplier may provide a plurality of different inserts and cases having different shapes and sizes to store a multitude of different items.

Providing the access openings 78, 79 in the lateral sides 34, 35 is advantageous because the access openings 78, 79 are neither visible nor accessible when the tailgate 28 is in the closed position because they are covered by the adjacent sidewalls 24 of the truck box 22. The storage compartment 74 and the openings 78, 79 are hidden from view, and consequently an unauthorized user would be unaware of the existence of the openings unless they were familiar with the particular features of the truck. Placing the access openings in the lateral sides reduces the need for a storage compartment lock.

Referring to FIG. 10, the tailgate 28 may include a cover 100 that is connectable with the lateral side 34, 35 to close the access opening 78. The cover is optional since the sidewall 24 blocks the access opening 78 when the tailgate is closed. The cover is provided to prevent contaminants, such as water or dirt, from entering into the storage compartment 74. The cover also prevents stored items from extending out of the storage compartment and contacting the sidewall 24. A same or similar cover may be provided to cover opening 79.

In one embodiment, the cover 100 is a rubber plug. The rubber plug may include an inner lip that engages the periphery of the opening 78 and an outer lip that engages an outer surface 60 of the lateral side 34 to secure the plug 100 to the lateral side 34 and to seal the opening 78 from water and dirt. The plug 100 may include a handhold 102 that allows a user to remove the plug 100 from the tailgate 28.

Referring to FIG. 11, another type of cover 104 includes a door 106 that covers the opening 78 when in a closed position on the tailgate. The door 106 may be formed of metal, plastic, composite, or other suitable material. The lateral side 34 may include a recessed portion surrounding the opening 78 to provide clearance for the door 106. The door 106 may be attached to the lateral side 34 by one or more hinges 112. A latch 108 secures the door in the closed position. The latch 108 may include a latching tab configured to engage the back of the lateral side 34 near the opening 78. A handle 110 is operably coupled to the latch 108 to pivot the latch relative to the door 106 to engage and disengage the elongate member with the back of the lateral side 34. In some embodiments, the hinges may be omitted in lieu of tabs that engage the back of the lateral side 34 to hold the door in place.

The door 106 may or may not include a locking mechanism since the truck box 22 prevents access to the storage compartment 74 when the tailgate is in the closed position. If the tailgate is lockable, providing a lock on the door 106 is redundant. In some embodiments, however, an additional lock may be provided on the door 106 for increased security. If the tailgate is not lockable, a locking mechanism may be advantageous.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A tailgate assembly comprising:
   a body including an outer side, an inner side, and a pair of lateral sides interconnecting the inner and outer sides to define an interior, one of the lateral sides defining an opening into the interior; and
   a structural beam disposed in the interior and defining a storage compartment accessible through the opening.

2. The tailgate assembly of claim 1 further comprising a cover attachable to the one of the lateral sides to cover the opening when in a closed position.

3. The tailgate assembly of claim 2, wherein the cover is a rubber plug having a portion receivable within the opening.

4. The tailgate assembly of claim 2, wherein the cover includes a latching mechanism engageable with the one of the lateral sides to prevent opening of the cover.

5. The tailgate assembly of claim 4, wherein the latching mechanism includes an elongate member that engages with a backside of the one of the lateral sides when the latching mechanism is in a locked position.

6. The tailgate assembly of claim 1 further comprising a liner disposed on an inside surface of the beam.

7. The tailgate assembly of claim 1 further comprising a storage case removably received within the storage compartment via the opening, wherein the storage case defines a cavity configured to receive a storage object therein.

8. The tailgate assembly of claim 7, wherein the storage case includes padding defining a cavity shaped to house a firearm.

9. A pickup-truck box comprising:
   opposing sidewalls; and
   a tailgate connected between the sidewalls and including:
      an outer panel,
      an inner panel,
      a side connecting between the panels and defining an opening, and
      a structural beam disposed in an interior defined between the panels and connected to one of the panels to define a storage compartment aligned with the opening.

10. The pickup-truck box of claim 9, wherein the beam has an interior surface and the tailgate further includes a liner disposed against the interior surface, and wherein the liner defines a wall of the storage compartment.

11. The pickup-truck box of claim 9, wherein the beam has a U-shaped cross section.

12. The pickup-truck box of claim 9, wherein the beam further includes:
   a pair of flanges attached to the inner panel,
   a pair of walls each extending from one of the flanges towards the outer panel, and
   a face plate connecting between the walls, wherein the face plate, walls, and inner panel cooperate to define the storage compartment.

13. The pickup-truck box of claim 9, further comprising a liner having a first portion covering inside surfaces of the beam.

14. The pickup-truck box of claim 13, wherein the liner further has a second portion covering an inside surface of the inner panel.

15. The pickup-truck box of claim 9, wherein the tailgate is pivotably attached to the sidewalls and pivotable between at least an open position and a closed position, and wherein the opening is positioned on the tailgate so that one of the sidewalls is adjacent to the opening when in the closed position to conceal the opening.

16. The pickup-truck box of claim 9 further comprising a cover connected to the lateral side and arranged to cover the opening when in a closed position.

17. The pickup-truck box of claim 9 further comprising a storage case removably received within the storage compartment through the opening, wherein the storage case defines a cavity configured to receive an object therein.

18. A tailgate assembly for a pickup-truck box having sidewalls comprising:
   a tailgate having an outer panel, an inner panel, and opposing side panels each facing one of the sidewalls and interconnecting the inner and outer panels to define a body defining an interior space;
   a pair of hinges pivotally attaching the tailgate to the sidewalls, wherein the tailgate is pivotal about the hinges between an open position and a closed position;
   a pair of latching components each disposed on one of the side panels and engageable with a corresponding latching component of one of the sidewalls to secure the tailgate in the closed position; and
   a structural beam disposed in the interior space and connected to one of the panels to define a storage compartment accessible through the opening defined in one of the side panels, wherein a corresponding one of the sidewalls blocks access to the opening when the tailgate is in the closed position.

\* \* \* \* \*